(12) United States Patent
Konya et al.

(10) Patent No.: US 6,811,225 B1
(45) Date of Patent: Nov. 2, 2004

(54) ERGONOMIC SEAT AND METHOD

(75) Inventors: Kazuhide Konya, Mercer Island, WA (US); Seiya Sakurai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/453,201

(22) Filed: Jun. 3, 2003

(51) Int. Cl.⁷ .................................................. A47C 7/50
(52) U.S. Cl. .............. 297/423.13; 297/321; 297/423.12
(58) Field of Search ................................. 297/316, 320, 297/321, 423.12, 423.13, 423.2, 423.21, 423.22, 423.24

(56) References Cited

U.S. PATENT DOCUMENTS

| | | | | |
|---|---|---|---|---|
| 2,545,679 A | * | 3/1951 | St. Germain | 297/423.2 |
| 3,295,885 A | * | 1/1967 | Barksdale | 297/84 |
| 4,765,684 A | * | 8/1988 | Kvalheim et al. | 297/423.13 |
| 4,832,407 A | * | 5/1989 | Serber | 297/423.12 |
| 4,848,841 A | * | 7/1989 | Giselsson | 294/423.13 |
| 5,333,818 A | * | 8/1994 | Brandt et al. | 297/423.22 |
| 5,542,746 A | * | 8/1996 | Bujaryn | 297/423.12 |
| 5,667,278 A | * | 9/1997 | Li | 297/423.13 |

OTHER PUBLICATIONS

Brochure on "Chairs—The Partition Company", dated Mar. 11, 2002, 1 page.
Brochure on "Stokke Products", dated Jun. 12, 2002, 3 pages.
Co-pending Application of Assignee, Serial No. 10/222,291 dated Aug. 15, 2002 to Gregory M. Schmidt.

* cited by examiner

Primary Examiner—Peter R. Brown
(74) Attorney, Agent, or Firm—Harness Dickey & Pierce P.L.C.

(57) ABSTRACT

A seat apparatus and method particularly well adapted for use in mobile platforms, and more particularly in a commercial aircraft. The seat apparatus includes a seat portion with linkage that enables a user to lift and tilt the seat portion forwardly while simultaneously moving a seat back of the apparatus from a reclined to a fully upright position. An extendable leg rest assembly allows the user to kneel thereon to further relieve lower back stress during prolonged periods of seating and to better enable the seat occupant to make use of a laptop computer or other equipment positioned in front of the occupant. The seat apparatus therefore provides a plurality of different seating positions for the occupant, thus enhancing the comfort of the occupant during prolonged seating periods and while the seat occupant is performing various tasks.

31 Claims, 6 Drawing Sheets

FIG 4
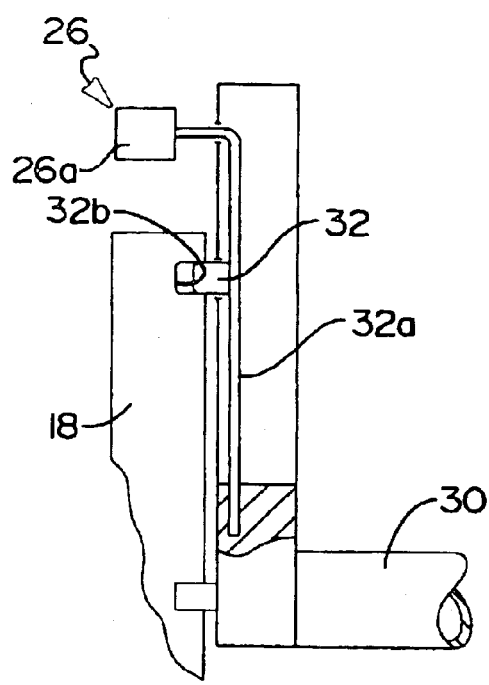
FIG 5
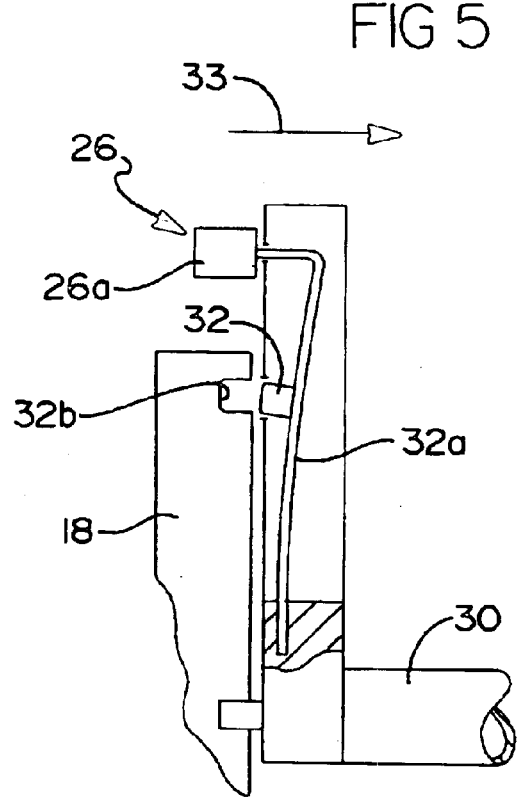
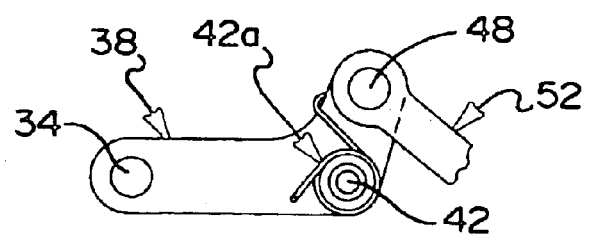
FIG 6

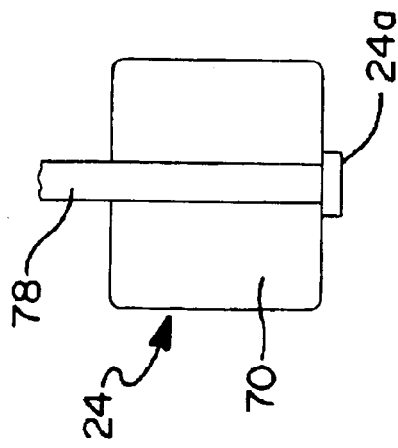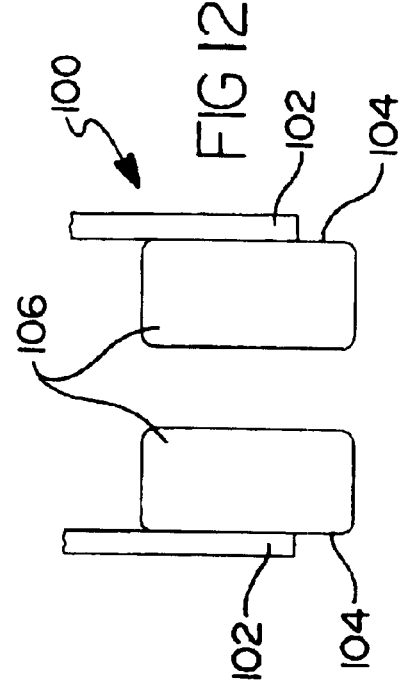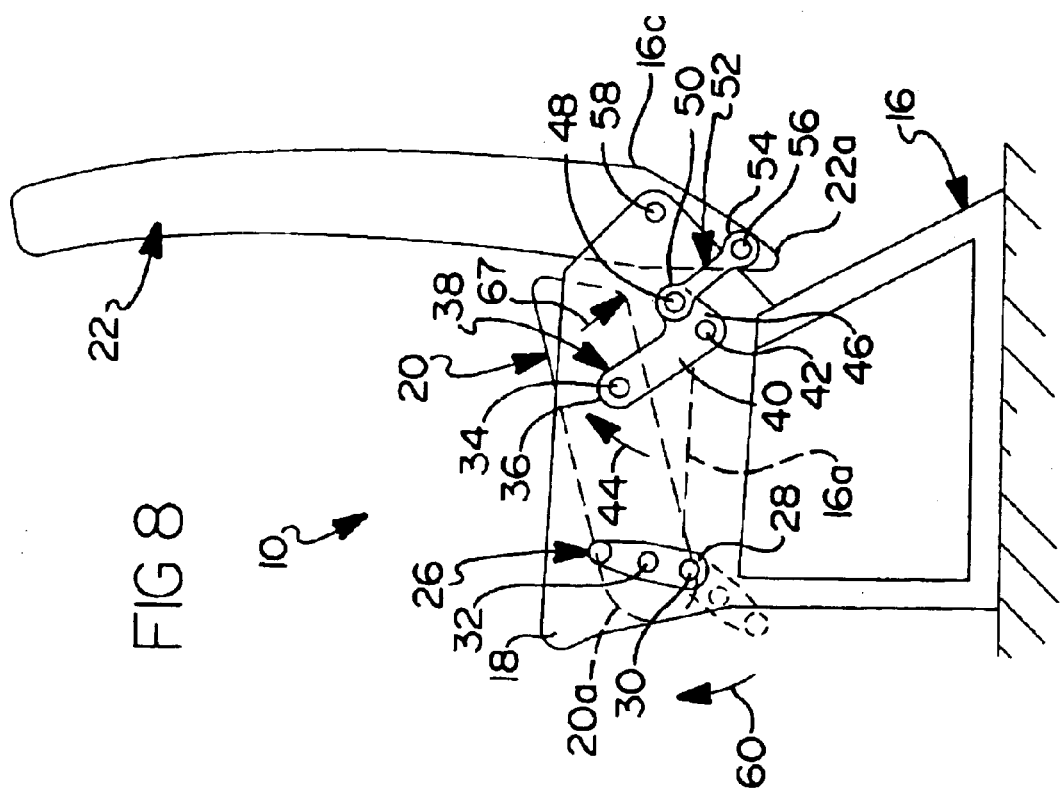

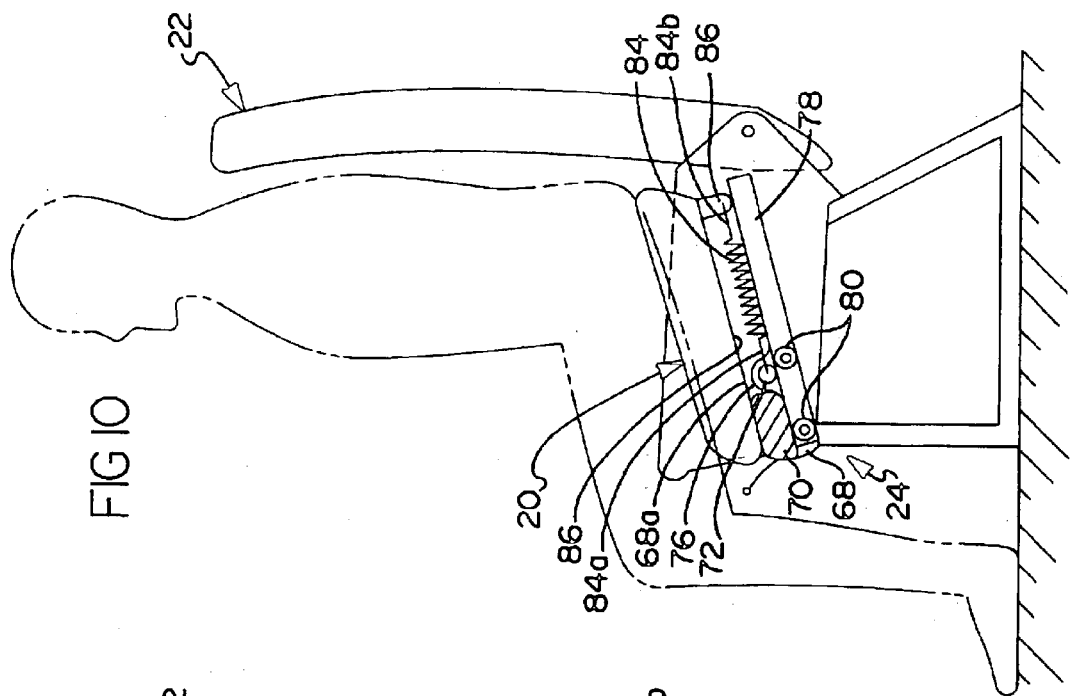
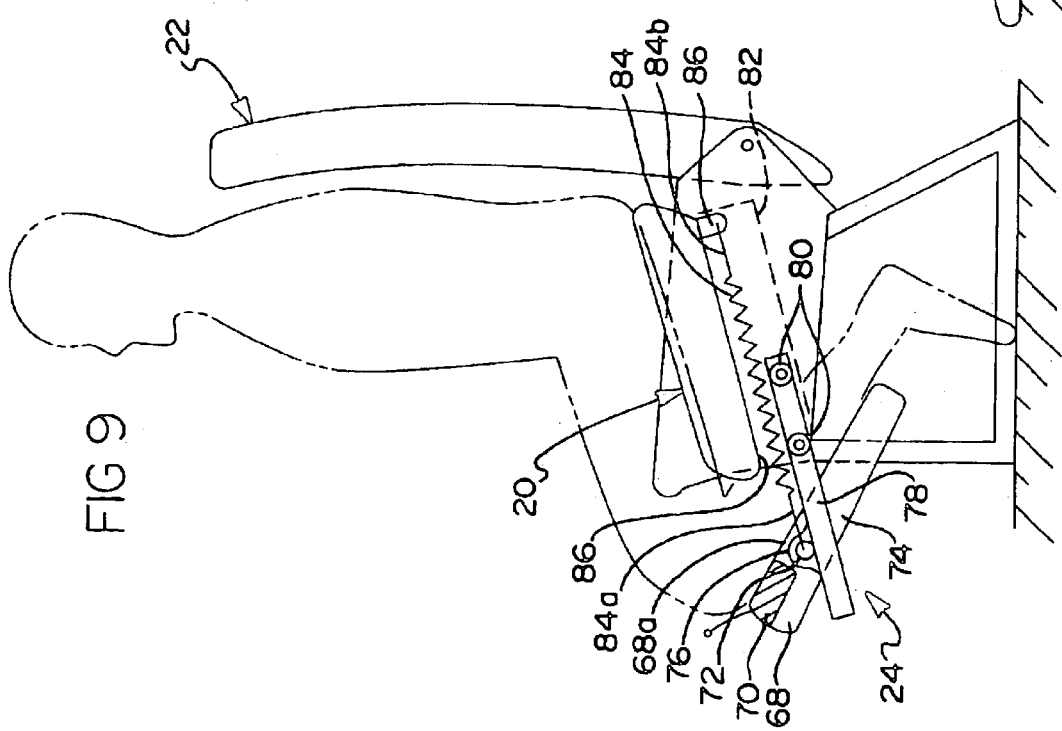

ERGONOMIC SEAT AND METHOD

FIELD OF THE INVENTION

The present invention relates to seating assemblies, and more particularly to an ergonomic seat assembly and method particularly well adapted for use in mobile platforms.

BACKGROUND OF THE INVENTION

Mobile platforms, and particularly commercial aircraft, employ a plurality of seats arranged in rows. Typically, each row comprises two or more seats disposed adjacent one another. With many mobile platforms, and especially with commercial aircraft, passengers traveling on the mobile platform wish to perform work tasks such as using a laptop computer and various other tasks which are performed more easily in an upright seated position. Additionally, passengers, or even crew members, on a mobile platform often are required to sit for long periods of time. With many conventional aircraft seats, the occupant is only afforded a small range of seating positions between a relatively upright position and a reclined position. However, it would be of additional benefit to passengers and crew members if yet another seating position could be provided which takes the stress off the lower back of the passenger/crew member.

Another drawback with some seats used on commercial aircraft is that the seat back portion of the seat cannot be brought into a fully vertical position. With many seats typically used on mobile platforms, especially commercial aircraft, the seat back portion of the seat, when in its fully upright position, still assumes somewhat of a slightly reclined orientation, thereby taking up a small amount of space in the row behind a given seat. Accordingly, it would be of even further benefit if each seat on a mobile platform was able to have its seat back portion moved into a fully upright (i.e., fully vertically oriented) position. This would even better facilitate ingress and egress to the seats located behind a given seat.

SUMMARY OF THE INVENTION

The present invention is directed to a seat apparatus and method of forming same in which a leg support assembly is provided which allows the seat occupant to assume a more upright position while performing various tasks, such as working on a laptop computer. The leg rest assembly also alleviates stress and strain on the lower back of the seat occupant by accommodating a portion of the weight of the seat occupant.

In one preferred form the seat apparatus further includes linkage that enables a seat back of the seat apparatus to be drawn into a fully upright (i.e., fully vertical) position which further enhances ingress/egress to the seats positioned behind a given seat apparatus.

While the apparatus and method of the present invention is particularly well adapted for use in mobile platforms, it will be appreciated that the seat apparatus can be adapted for use in any structure where it is desired to provide individuals with a variety of seating positions to better facilitate various work tasks, as well as to provide additional seating comfort to the individuals.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4 and 5 illustrate a plan view of a portion of the seat of FIG. 3 showing how the selector is moved out of its detent position;

FIG. 6 is an enlarged view of a portion of the aft link illustrating the torsion spring associated therewith.

FIG. 8 is a side view of the seat apparatus of FIG. 3 showing the seat back in its fully upright position with the seat portion raised;

FIG. 9 is a side cross sectional view of the seat apparatus of FIG. 2 showing the leg rest portion of the seat apparatus in its extended position for supporting a portion of the weight of an individual seated in the seat apparatus;

FIG. 10 is a side cross sectional view of the seat of FIG. 9 but with the leg rest portion in a fully retracted position;

FIG. 11 is a plan view of a portion of the leg rest assembly; and

FIG. 12 is a perspective view of an alternative leg rest assembly incorporating a pair of separate leg rest members.

DETAILED DESCRIPTION OF THE PREFERRED EMBODIMENTS

The following description of the preferred embodiment(s) is merely exemplary in nature and is in no way intended to limit the invention, its application, or uses.

Figure 1:
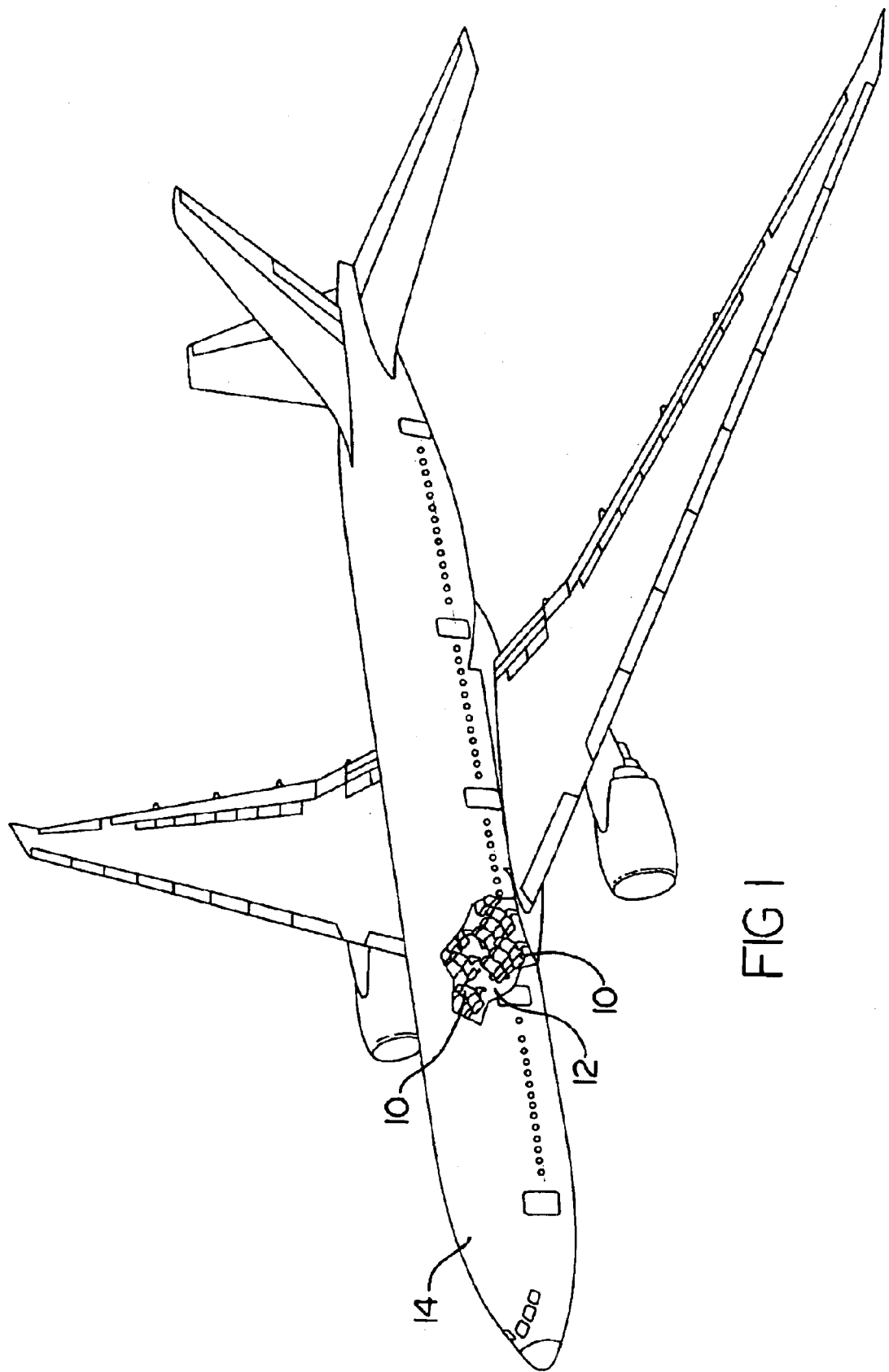
FIG. 1 is a view of a mobile platform in the form of a commercial aircraft illustrating a plurality of seat apparatuses each in accordance with a preferred embodiment of the present invention.

Referring to FIG. 1, there is shown a plurality of seat apparatuses 10, each in accordance with the preferred embodiment of the present invention, arranged in a plurality of rows. The seat apparatuses 10 are adapted to be fixedly secured to a floor surface 12 of a structure, in this example, a mobile platform 14 in the form of a commercial aircraft. It will be appreciated immediately, however, that the seat apparatus 10 could be used in any structure where it is desired to provide seat occupants with a plurality of seating positions. It is anticipated, however, that the seat apparatus 10 of the present invention will find particular utility in mobile platforms that carry passengers significant distances, and where the ability to provide passengers and crew members with a plurality of seating positions to better enable the seat occupants to accomplish various work tasks while seated, as well as to increase the comfort of the seat occupants over a period of time, will be important.

Figure 2:
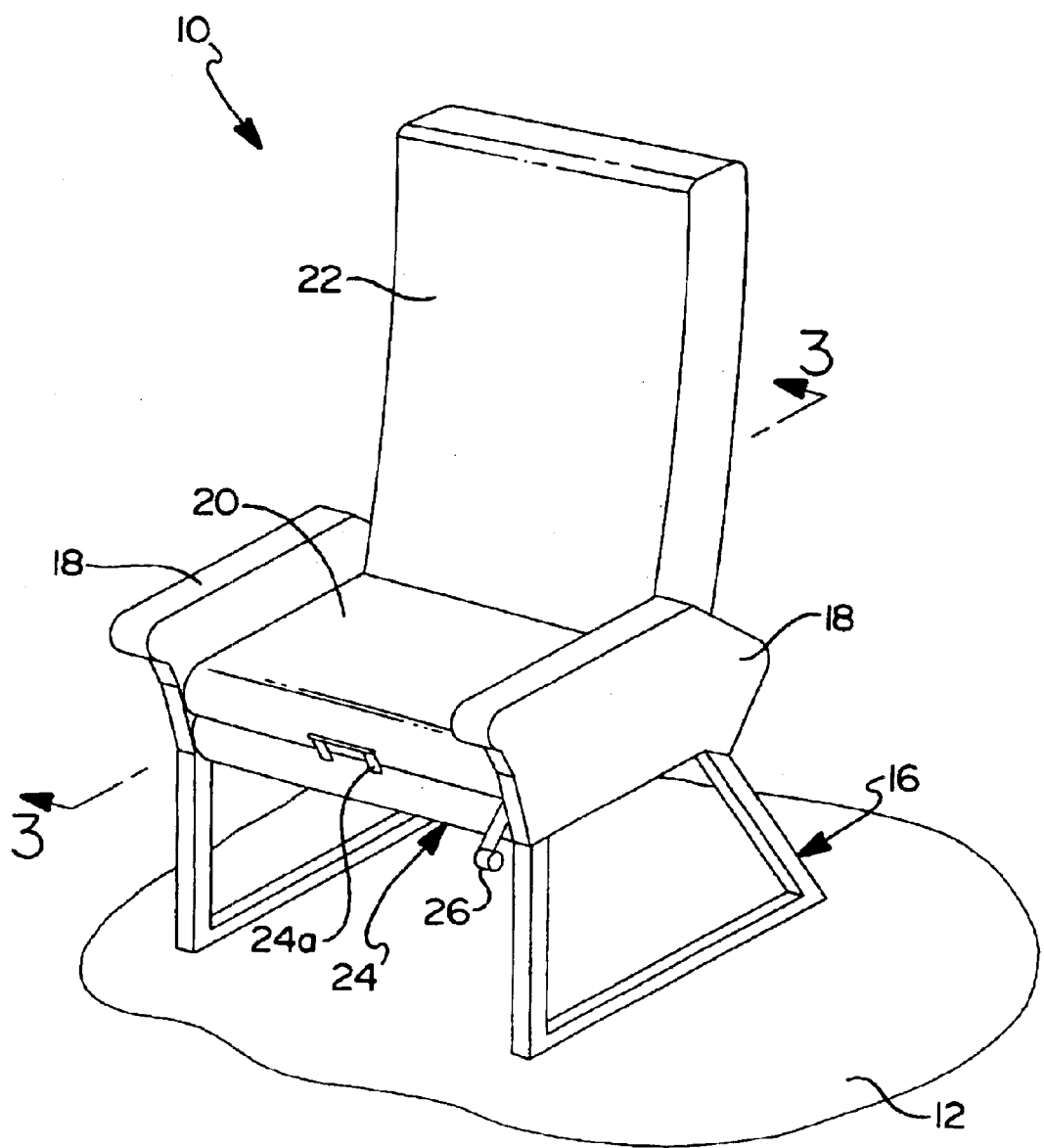
FIG. 2 is an enlarged perspective view of one of the seat apparatuses shown in FIG. 1.

Referring to FIG. 2, each seat apparatus 10 includes a frame portion 16 which allows the seat apparatus 10 to be secured fixedly to the floor 12 of the mobile platform to which the seat apparatus is mounted. Coupled to the frame 16 are a pair of arm portions 18. A seat portion 20 is also supported by the frame 16, as is a seat back 22. A leg rest assembly 24 (shown in its retracted position) having a pull out handle 24a is further provided so as to reside generally beneath the seat portion 20 when in its fully retracted position. Positioned adjacent to the leg rest assembly 24 is a selector lever 26 which, as will be explained more fully in the following paragraphs, enables the seat apparatus 10 to be articulated between its various operative positions.

Figure 7:
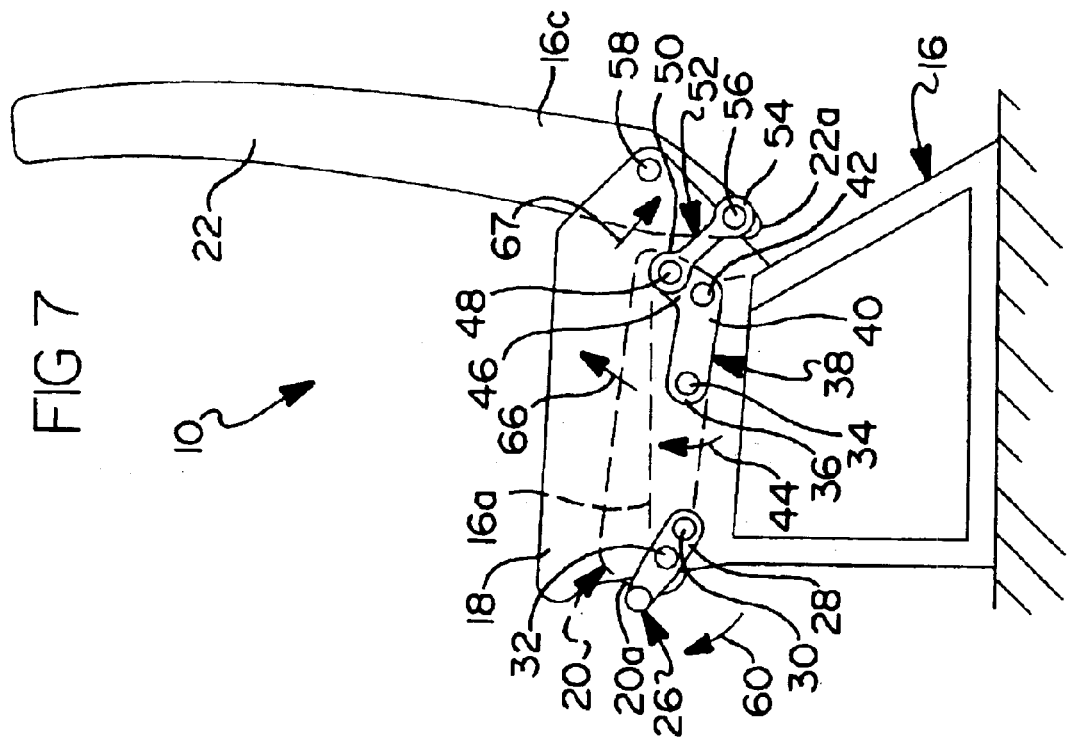
FIG. 7 shows the seat apparatus of FIG. 2 with the seat portion being moved into its lifted position.
Figure 3:
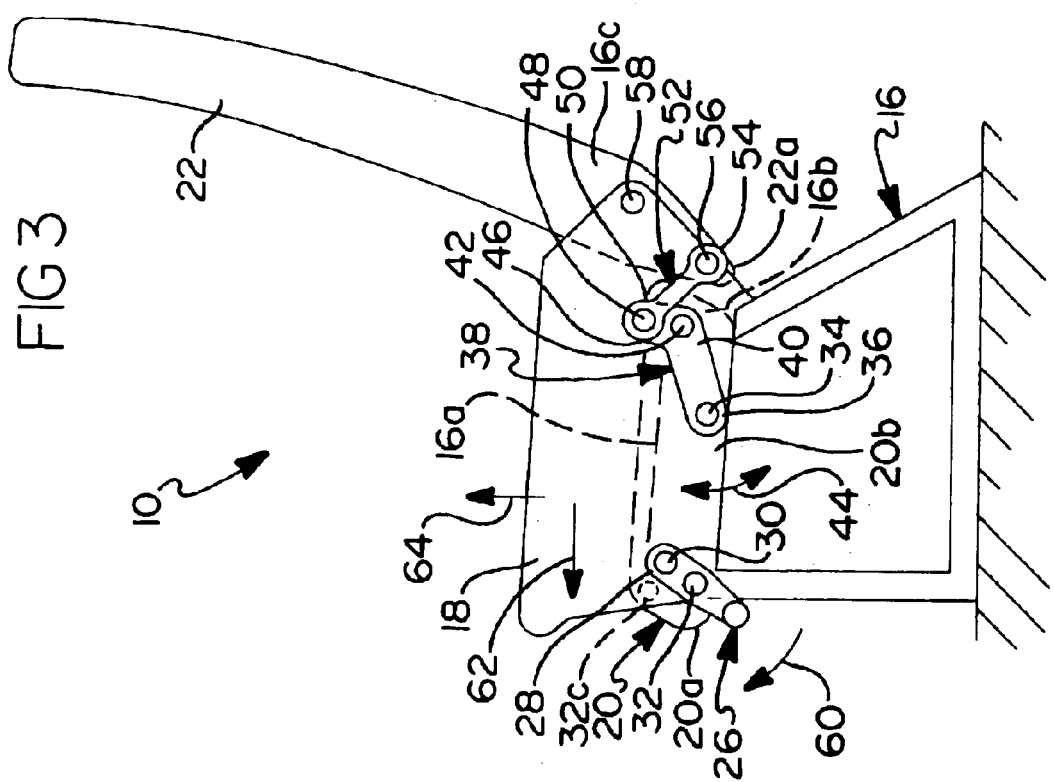
FIG. 3 is a partial side cross sectional view of the seat apparatus of FIG. 2 taken in accordance with section line 3—3 in FIG. 2 illustrating a linkage assembly used to manipulate and position the seat portion and seat back of the seat apparatus, with the seat back further being shown in a reclined position.

Referring to FIG. 3, the seat apparatus 10 is shown without the leg rest assembly 24 for purposes of better illustrating those components which enable articulation of the seat portion 20 and the seat back 22. The selector lever 26 is coupled at a first end 28 to a torque rod 30, which is in turn supported from side arm portion 18. The selector lever 26 also includes a detent member 32 formed at a midpoint of a flexible elongated member 32a, and is disposed adjacent a forward portion 20a of the seat portion 20. With brief reference to FIGS. 4 and 5, the selector lever 26 can be seen in further detail. The detent member 32 fits within a lower detent recess 32b in arm structure 18 to hold the seat 20 in the position shown in FIG. 2. Pushing inwardly (i.e., toward the opposite lateral side of the seat apparatus 10) on a handle portion 26a of the selector lever 26 in accordance with arrow 33 releases the detent member 32 from detent recess 32b, as shown in FIG. 5, thus allowing the seat portion 20 to be urged into its elevated position (FIG. 7).

With further reference to FIG. 3, the seat structure 18 includes an upper detent recess 32c into which the detent member 32 engages when the seat portion 20 is urged into its raised position. A lateral link 16a forming a portion 20b of the seat is pivotally coupled via a pivot pin 34 to a first end 36 of an aft link 38, and at a forward end thereof to the selector lever 26. The aft link 38 is fixedly coupled at an intermediate point 40 to a torque rod 42, adjacent a rear portion 16b of the frame 16. Thus, aft link 38 is able to pivot in response to rotational movement of the torque rod 42 in the direction of arrow 44. The torque rod 42 is supported from seat side arm portion 18.

With brief reference to FIG. 6, a torsion spring 42a is disposed on the torque rod 42, with its ends coupled to the aft link 38 and a portion of the arm portion 18. The torsion spring 42a provides a biasing force that tends to urge the aft link 38 rotationally in accordance with arrow 44 in FIGS. 3 and 7 (i.e., clockwise in these Figures).

With further reference to FIG. 3, a second end 46 of the aft link 38 is pivotally coupled via a pivot pin 48 or like member to a first end 50 of a coupling link 52. A second end 54 of the coupling link 52 is coupled via a pivot pin 56 to a lower edge 22a of the seat back 22. Seat back 22 is further pivotally coupled at a rearward portion 16c to the coupling link 52 via a pivot pin 58. Accordingly, the entire seat back 22 is able to pivot rotationally about pivot pin 58 between a reclined position shown in FIG. 3 and the upright position as shown in FIG. 4. Torque rods 30 and 42 extend to, and are coupled to a second pair of links 26, 38 and 52 at the opposite side of the seat apparatus 10 to support the seat portion 20 and seat back 22 at the opposite side of the seat apparatus 10 also. FIG. 7 is a view of the seat apparatus 10 of FIG. 3 but with the seat apparatus in its intermediate position as the seat back 22 thereof is moved into a fully upright position.

With further reference to FIGS. 3, 5 and 7, operation of the seat apparatus 10 will now be described. The position shown in FIG. 3 represents a slightly reclined seating position for the seat occupant. When it is desired to use the leg rest assembly 24, the user pulls inwardly (along line 33 in FIG. 5) on the selector level 26 to move detent 32 out of the recess 32a. This allows the torsion spring 42a (FIG. 6) to urge the selector lever 26 clockwise, via lateral movement of lateral link 16a, and the seat portion upwardly in accordance with directional arrow 64 (FIG. 3). This also causes the forward edge 20a of the seat portion 20 to be moved forwardly in accordance with directional arrow 62 (FIG. 3).

Referring to FIG. 7, the seat apparatus 10 is shown in its intermediate position as the selector lever 26 is being rotated to its fully raised position by the biasing force of the torsion spring 42a. The combined rotational movements of selector lever 26 and aft link 38 serve to lift the forward edge 20a of the seat portion 20 upwardly while also substantially simultaneously lifting a rear portion 20b of the seat portion 20 upwardly to an even greater degree than the front portion 20a, as noted in FIGS. 7 and 8.

With specific reference to FIGS. 7 and 8, as continued rotation of the selector lever 26 and aft link 38 occurs, the rotational movement of the aft link 38 in accordance with directional arrow 44 simultaneously causes the second end 54 of the coupling link 52 to be pushed generally in the direction of arrow 67, which in turn causes the seat back 22 to pivot about pivot pin 58 into the fully upright position shown in FIG. 8. The seat back 22 reaches the fully upright position in FIG. 8 just as the selector lever 26 is urged into its fully upright position shown in FIG. 8, and into detent recess 32b. It will be appreciated that when the seat back 22 is in the position shown in FIG. 8, ingress and egress to/from seats located behind the seat apparatus 10 is significantly improved.

Referring now to FIGS. 9 and 10, the construction and operation of the leg rest assembly 24 will be described. Leg rest assembly 24 includes a leg rest member 68 (also shown in FIG. 11) having a padded portion 70 upon which the knees of the seat occupant can rest when the leg rest assembly is in its operative position shown in FIG. 9. The leg rest member 68 is pivotally coupled by a pivot pin or leg member 72 at an intermediate portion 74 to a mounting portion 76 of a frame member 78. Frame member 78 is supported by a pair of rollers 80 that are coupled to a frame element 82. The frame element 82 is fixedly coupled to, and forms a portion of, the seat portion 20. The wheels 80 allow the frame member 78 to move slidably between the positions shown in FIGS. 9 and 10. A biasing spring 84 is coupled to the mounting portion 76 at a first end 84a and to a mounting flange 86 associated with the frame element 82 at a second end 84b.

With further reference to FIGS. 9 and 10, in operation, the user brings the leg rest assembly 24 into the operative position shown in FIG. 9 by pulling forwardly on the pull out handle 24a until the frame member 78 is in its fully forwardly extending position, as shown in FIG. 9. The user then kneels on the padded portion 70 of the leg rest member 68. To place the leg rest assembly 24 into its stowed position shown in FIG. 10, the user lifts his/her legs from the leg rest member 68 to allow it to be drawn into the fully stowed position by the biasing member 84, as shown in FIG. 10. As the frame member 78 is retracted into the fully stowed position in FIG. 10, an upper surface 68a of the leg rest member 68 abuts a lower portion 86 of the seat portion 20 and rotates counterclockwise in the drawing of FIG. 9 as it is urged into the fully retracted position of FIG. 10. The force provided by the biasing member 84 is selected such that the leg rest assembly 24 can be easily pulled into the position shown in FIG. 9 with a minimal degree of effort by the seat occupant.

It will be appreciated that while the seat apparatus 10 has been described as having the seat back 22 in the fully upright position when the leg rest assembly 24 is in use, that the leg rest assembly does not need to be in its fully extended (i.e., operative) position when the seat back 22 is positioned in its fully upright position. Thus, the occupant, if he or she so chooses, can just as readily sit with the seat apparatus 10 in the position shown in FIG. 10 without using the leg rest assembly 24.

The seat apparatus 10 of the present invention thus provides a seat occupant with a number of different seating positions which can add to the comfort of the occupant in the event the occupant is required to be seated for extended periods of time. The extendable leg rest assembly 24 of the present invention further enhances utility of the seat apparatus 10 by providing the user with a comfortable position that relieves pressure on the lower back of the occupant, and which further enhances the ease with which the occupant may use a laptop computer or other component positioned on a pull down tray of the seat in front of the occupant. Still further, it is anticipated that many individuals will find the seated position shown in FIG. 10 to be comfortable for eating meals positioned on a pull down tray of the seat in front of the occupant.

It is a further advantage of the seat apparatus 10 that same significantly eases the ingress/egress to and from seats positioned behind the seat apparatus 10, thus expediting boarding and de-planing on a commercial aircraft or on other mobile platforms where movement through the limited spaces between rows of seats can be difficult.

Yet another advantage of the seat apparatus 10 is that the apparatus does not increase the envelope or the footprint over that of conventional seats typically employed on mobile platforms such as commercial aircraft. Thus, the seat apparatus 10 is anticipated to be retrofittable to a wide number of mobile platforms, and more particularly to a wide variety of commercial aircraft.

Referring now to FIG. 12, there is shown a leg rest assembly 100 in accordance with an alternative preferred form of the present invention. The leg rest assembly 100 is coupled by frame members 102 at outwardly facing portions 104 of a pair of leg rest members 106. The frame member 102 can be supported by a suitable arrangement of rollers similar to that described in connection with the seat apparatus 10 of FIGS. 9 and 10. It will be appreciated that other variations of the leg rest assembly could also be incorporated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat comprising:
   a seat portion upon which an individual can sit, said seat portion having a rear portion and being movable from a first position, wherein said seat portion supports said individual in a slightly reclined orientation, to a second position wherein said seat portion is disposed at least slightly above said first position for supporting a back of said individual in a generally upright position;
   a seat back portion for supporting a back of said individual, said seat back portion being pivotally coupled to said rear portion of said seat portion such that said seat back portion can be moved from a reclined position into a generally vertical position;
   a leg rest assembly operably associated with said seat portion and movable generally linearly in a sliding fashion from a stowed position into a usable position projecting forwardly of said seat portion, to thereby enable said individual to kneel on said leg rest assembly; and
   a frame for supporting said seat portion and said seat back above a support surface.

2. The seat of claim 1, wherein a portion of said leg rest assembly is pivotally secured to said seat portion to enable pivoting movement of said portion when said leg rest assembly is in its usable position.

3. The seat of claim 1, wherein said leg rest assembly, when in said stowed position, is positioned below said seat portion.

4. The seat of claim 1, wherein said leg rest assembly, when in said useable position, is positioned forwardly of, and below, said seat portion.

5. The seat of claim 1, wherein said frame is adapted to be fixedly secured by at least one fastening element to said support surface such that said seat is not movable.

6. The seat of claim 1, further comprising an aft link operably associated with said seat portion and said seat back, for urging said seat portion from said first position to said second position.

7. The seat of claim 6, further comprising a biasing spring associated with said aft link for urging said seat portion from said first position to said second position.

8. The seat of claim 1, wherein said seat portion comprises a selector control for enabling a user to initiate movement of said seat portion from said first position into said second position.

9. The seat of claim 8, wherein said selector control comprises a selector lever having a detent.

10. The seat of claim 1, further comprising a coupling link for operatively coupling said seat portion with said seat back portion, such that movement of said seat portion effects movement of said seat back portion.

11. A seat comprising:
    a seat portion upon which an individual can sit, said seat portion having a rear portion and being movable from a first position, wherein said seat portion supports said individual when said individual is sitting both in an upright position and in a slightly reclined orientation, to a second position in which said seat portion is raised above said first position and supports said individual with said individual's back in a generally vertical position;
    a seat back for supporting a back of said individual, said seat back being pivotally movable relative to said rear portion of said seat portion such that said seat back can be moved from a reclined position into a generally vertical position;
    a leg support assembly operably associated with said seat portion and movable generally linearly in sliding fashion from a stowed position underneath said seat portion into a usable position projecting forwardly of said seat portion, to thereby enable said individual to kneel on said leg support assembly; and
    a frame for supporting said seat portion above a support surface.

12. The seat of claim 11, wherein said leg support assembly projects forwardly of said seat portion and is angled non-parallel to said seat portion to facilitate said individual kneeling thereon.

13. The seat of claim 11, wherein said leg support assembly comprises a knee support member and a frame member for supporting said knee support member from said at least one of said seat portion and said frame.

14. The seat of claim 11, wherein said leg support assembly comprises:

a first leg support pad;

a second leg support pad;

a first coupling member operably associated with one of said frame and said seat portion for supporting said first leg support pad for pivotal movement relative to said seat portion; and a second coupling member operably associated with one of said frame and said seat portion for supporting said second leg support pad for pivotal movement relative to said seat portion.

15. The seat of claim 11, wherein said seat portion is supported from said frame by a pair of links.

16. The seat of claim 15, wherein said links comprise:

a coupling link for supporting a forward portion of said seat portion; and an aft link for supporting a rearward portion of said seat portion.

17. The seat of claim 16, wherein:

said coupling link pivotally supports said forward portion of said seat portion relative to said frame; and wherein said aft link pivotally supports a rearward portion of said seat portion relative to said frame.

18. The seat of claim 11, wherein said leg support assembly includes a leg rest member pivotally coupled to a frame element.

19. The seat of claim 18, wherein said frame element is supported by a pair of rollers from a lower portion of said seat portion.

20. The seat of claim 11, wherein when said seat portion is moved into said second position, said seat back is automatically urged into said generally vertical position.

21. The seat of claim 20, wherein said seat portion is supported from said frame by a pair of links, and a lower portion of said seat back is pivotally coupled to one of said links.

22. The seat of claim 21, further comprising a torsion spring operably associated with one of said links for urging said seat portion from said first position to said second position.

23. The seat of claim 11, further comprising a biasing member coupled between said leg support assembly and one of said frame and said seat portion for assisting in returning said leg support assembly from said useable position into said stowed position.

24. A seat for a mobile platform, comprising:

a seat portion upon which an individual can sit, said seat portion having a rear portion and being movable from a first position, wherein said seat portion is generally horizontally disposed and supports said individual when said individual is sitting both in an upright position and in a slightly reclined orientation, to a second position in which said seat portion is inclined forwardly above said first position and places said individual in a position such that said individual's back is in a generally vertical position;

a back portion for supporting said back of said individual, said back portion being pivotally movable relative to said rear portion of said seat portion such that said back portion can be moved from a reclined position into a generally vertical position;

a leg rest assembly operably associated with said seat portion and movable generally linearly in sliding fashion from a stowed position underneath said seat portion into a usable position projecting forwardly of said seat portion and non-parallel to said seat portion, to thereby enable said individual to comfortably kneel on said leg rest assembly when said seat portion is in said second position;

a frame for supporting said seat portion above a support surface; and a pair of links for pivotally supporting said seat portion relative to said frame.

25. The seat of claim 24, wherein said leg rest assembly comprises a leg support pad and a coupling element for supporting said leg support pad from at least one of said seat portion and said frame.

26. The seat of claim 24, wherein said leg rest assembly comprises:

a first leg support pad;

a second leg support pad spaced apart from said first leg support pad;

a first coupling member operably associated with one of said frame and said seat portion for supporting said first leg support pad for pivotal movement between said stowed position and said useable position, relative to said seat portion; and a second coupling member operably associated with one of said frame and said seat portion for supporting said first leg support pad for pivotal movement.

27. The seat of claim 24, wherein one of said pair of links pivotally couples a forward end of said seat portion to said frame, and the other one of said links pivotally couples a rearward portion of said seat to said frame.

28. The seat of claim 24, further comprising a third link pivotally coupled to said second one of said links and to a lower portion of said seat back for urging said seat back between said reclined and upright positions.

29. The seat of claim 24, wherein said leg rest assembly comprises a frame member supported for linear movement relative to said seat portion by a pair of rollers.

30. The seat of claim 29, wherein said leg rest assembly further comprises a biasing element coupled at a first end to a frame element of said seat portion, and at a second end to said frame member, for assisting in returning said leg rest member to a stowed position when not in use by said individual.

31. The seat of claim 29, wherein said leg rest assembly comprises a leg rest pad pivotally coupled to said frame member, and a pull out handle for facilitating movement of said leg rest assembly into said useable position.

\* \* \* \* \*